US006751196B1

(12) United States Patent
Hulyalkar et al.

(10) Patent No.: US 6,751,196 B1
(45) Date of Patent: Jun. 15, 2004

(54) APPARATUS AND METHOD FOR PEER-TO-PEER LINK MONITORING OF A WIRELESS NETWORK WITH CENTRALIZED CONTROL

(75) Inventors: Samir N. Hulyalkar, Ossining, NY (US); Yonggang Du, Aachen (DE); Christoph Herrmann, Aachen (DE); Chiu Ngo, Ossining, NY (US); Peter Klaus May, Aachen (DE)

(73) Assignee: Philips Electronics North America Corp., New York, NY (US)

( * ) Notice: Subject to any disclaimer, the term of this patent is extended or adjusted under 35 U.S.C. 154(b) by 0 days.

(21) Appl. No.: 08/919,052

(22) Filed: Aug. 27, 1997

(51) Int. Cl.[7] .............................................. H04L 12/26
(52) U.S. Cl. ....................................... 370/252; 370/255
(58) Field of Search ................................. 370/332, 333, 370/252, 248, 249, 406, 260, 261, 262, 263, 465, 395, 328, 329, 330, 338, 340, 341, 347, 442, 312, 346, 255; 455/67.1, 69, 507, 508, 331, 335–337; 371/3, 5.1, 5.3, 2.05

(56) References Cited

U.S. PATENT DOCUMENTS

| | | | | |
|---|---|---|---|---|
| 4,837,850 A | * | 6/1989 | Maisel et al. ................ | 370/503 |
| 4,853,927 A | * | 8/1989 | Wenzel ......................... | 370/218 |
| 5,200,956 A | * | 4/1993 | Pudney et al. .............. | 370/280 |
| 5,276,905 A | * | 1/1994 | Hurst et al. ................... | 455/62 |
| 5,361,258 A | * | 11/1994 | Arnold et al. ............... | 370/330 |
| 5,418,838 A | * | 5/1995 | Havermans et al. ......... | 370/331 |
| 5,475,868 A | * | 12/1995 | Duque-Anton et al. ..... | 455/67.1 |
| 5,561,769 A | * | 10/1996 | Kumar et al. ................ | 370/396 |
| 5,583,866 A | * | 12/1996 | Vook et al. ................... | 370/312 |
| 5,612,960 A | * | 3/1997 | Stevens et al. .............. | 714/712 |
| 5,623,495 A | * | 4/1997 | Eng et al. ..................... | 370/397 |
| 5,717,689 A | * | 2/1998 | Ayanoglu ..................... | 370/349 |
| 5,737,318 A | * | 4/1998 | Melnik ......................... | 370/254 |
| 5,757,783 A | * | 5/1998 | Eng et al. ..................... | 370/315 |
| 5,787,080 A | * | 7/1998 | Hulyalkar et al. ........... | 370/348 |
| 5,802,466 A | * | 9/1998 | Gallant, et al. .............. | 455/413 |
| 5,812,531 A | * | 9/1998 | Cheung et al. .............. | 370/255 |
| 5,822,309 A | * | 10/1998 | Ayanoglu et al. ........... | 370/315 |
| 5,822,361 A | * | 10/1998 | Nakamura et al. .......... | 375/202 |
| 5,872,773 A | * | 2/1999 | Katzela et al. .............. | 370/256 |

FOREIGN PATENT DOCUMENTS

| | | | | |
|---|---|---|---|---|
| EP | 0777395 A1 | 6/1997 | ............ | H04Q/7/24 |
| WO | WO9634501 | 10/1996 | ............ | H04Q/7/22 |

OTHER PUBLICATIONS

Implementation and Analysis of Connection–Management Procedures in a Wireless ATM LAN by Veeraraghavan, M., et al, ISSS 0–7803–3300–4/96 copyright 19996 pp. 380–386, 1996.*
BAHAMA: A Broadband Ad–Hoc Wireless ATM Local–Area Network. K.Y.Eng., et al., ISSN 0–7803–2486–2/95 pp. 1216–1223, 1995.*
Mobility–Management and Media–Access Issues in the BAHAMA Wireless ATM LAN, M. Karok, et. al, ISSN 0–7803–2955–4/95 pp. 758–762, 1995.*

* cited by examiner

Primary Examiner—Melvin Marcelo
Assistant Examiner—Soon-Dong Hyun
(74) Attorney, Agent, or Firm—Gregory L. Thorne

(57) ABSTRACT

Centrally controlled wireless networks require reliable communications between the central controller and each of the stations within the wireless networks. The structure of a wireless network is often dynamic, or ad-hoc, as stations enter and exit the network, or are physically relocated. The selection of the central controller for the network may also be dynamic, either because the current central controller desires to exit the network, or because the communication between the current central controller and one or more of the stations is poor. This invention discloses a method and apparatus for assessing the quality of the communication paths among all stations in the network. This assessment is useful as a continual monitor of the quality of the network, and can be utilized to select an alternative central control station based upon the quality of communication paths to and from this station. Additionally, the quality assessment can be utilized to establish relay communication paths, as required.

28 Claims, 4 Drawing Sheets

RECEIVER

| | 1 | 2 | 3 | 4 | 5 | 6 | 7 | 8 |
|---|---|---|---|---|---|---|---|---|
| 1 | - | 84 | 21 | - | 73 | 88 | - | 72 |
| 2 | 82 | - | 63 | - | 70 | 48 | - | 83 |
| 3 | 35 | 61 | - | - | 64 | 89 | - | 46 |
| 4 | 0 | 0 | 0 | - | 0 | 0 | - | 0 |
| 5 | 71 | 74 | 67 | - | - | 81 | - | 69 |
| 6 | 80 | 53 | 91 | - | 83 | - | - | 51 |
| 7 | 0 | 0 | 0 | - | 0 | 0 | - | 0 |
| 8 | 78 | 82 | 42 | - | 66 | 45 | - | - |

TRANSMITTER

FIG. 5

APPARATUS AND METHOD FOR PEER-TO-PEER LINK MONITORING OF A WIRELESS NETWORK WITH CENTRALIZED CONTROL

BACKGROUND OF THE INVENTION

1. Field of the Invention

This invention relates to the monitoring of peer to peer links in a wireless network, and in particular to the determination of an optimal network structure in dependence upon the monitored quality of these links. The invention is particularly well suited for wireless systems having a centralized control station, and is further well suited for wireless ATM (Asynchronous Transfer Mode) networks.

2. Discussion of the Related Art

A communications network requires a network protocol to operate effectively and efficiently. One such protocol for a wireless network is a contention based protocol. In a contention based protocol network, any station is free to transmit whenever another station is not currently transmitting. Such a protocol, however, exhibits inefficiencies due to collisions, wherein two transmitters attempt to initiate transmission at the same time. The likelihood of collisions increase with an increase in network traffic, making contention based protocols inefficient for high traffic networks. Because collisions may occur, and will be undetectable by each of the transmitters, the contention based protocol typically requires an acknowledgment from the intended receiver to the transmitter, further limiting the network's efficiency, and further increasing the likelihood of collisions.

An alternative to a contention based protocol is a centralized control protocol, wherein one station in the network determines when each of the other stations may transmit. Each station transmits only during its allocated time, thereby eliminating the possibility of collisions, and thereby increasing the efficiency of the network. The communication of the information related to the control of the network incurs an overhead inefficiency, but this overhead is relatively independent of the quantity of communications on the network. Therefore, the centralized control protocol is particularly well suited for high traffic networks, or networks which require a deterministic quality of service (QoS), such as ATM.

An essential element to a centralized control protocol is that each station on the network must be able to communicate with the centralized controller. Wireless networks, however, often support mobile stations, and the ability to communicate between the controller and the mobile station must be assured regardless of the location of mobile station. One architecture commonly utilized is a cellular network, wherein central controllers are placed throughout a region, each central controller having a local transmission area, or cell, within which communications with a station can be expected to be reliable. The central controllers are placed such that any point in the region lies within at least one cell. Such a cellular approach, however, requires that the central controllers be stationary, and does not readily allow for a wireless communications network within which all stations may be mobile.

To support a wireless network having a centralized control structure, yet still allow for freedom of movement amongst all the stations on the network, the control structure should be reconfigurable, in dependence upon the changing environment. If communications within the current structure are poor, the structure should be changed to one which provides for a higher quality of communications. To effect such a reconfigurable network, a means must be provided to assess the quality of the existing network structure, and also to estimate the quality of an alternative network structure.

SUMMARY OF THE INVENTION

An object of this invention is to provide a method and apparatus for determining the quality of the communication paths within a network. It is a further object of this invention to utilize this quality determination to optimize the structure of the network. It is a further object of this invention to utilize this quality determination to establish optimized paths for retransmission links within the network.

The quality of the communication paths within a network is determined by having each station within the network monitor and assess the quality of reception of transmissions from each of the other stations within the network. These individual quality assessments are forwarded, periodically or on demand, to a centralized controller. These assessments then form a matrix of quality assessments, from which the structure of the network can be optimized, by selecting, for example, the station having the overall best quality measure relative to each of the others. The network is thereafter reconfigured to replace the current, sub-optimal, centralized control station with the selected station.

The matrix of quality assessments can also be utilized to identify problematic terminal-to-terminal links, and to institute retransmission relay paths to overcome the poor quality links.

BRIEF DESCRIPTION OF THE DRAWINGS

FIG. 5 shows a Link Quality Matrix for a wireless network.

DESCRIPTION OF THE PREFERRED EMBODIMENTS

For the purposes of this disclosure, the wireless networks described herein are presented in the context of wireless ATM (Asynchronous Transfer Mode) terminals, and protocols developed to efficiently manage the use of ATM for ad-hoc wireless communications networks. It will be evident to one skilled in the art that the techniques and methods presented herein are applicable to other network architectures and protocols, and are well within the spirit and scope of this invention.

Figure 1:
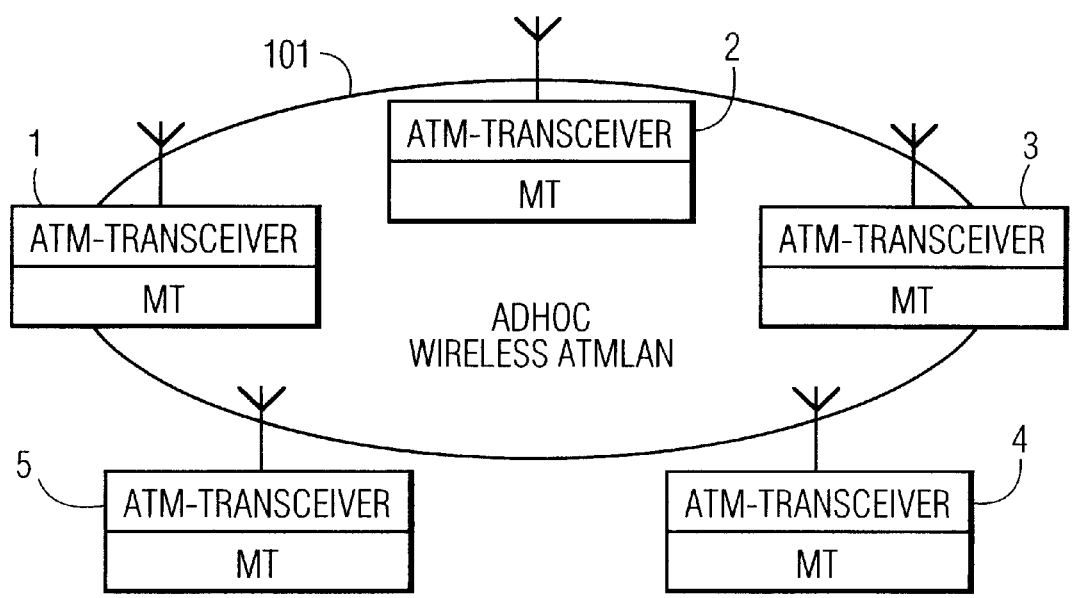
FIG. 1 shows a Wireless Network, comprised of wireless terminals and a centralized controller.

FIG. 1 shows an adhoc wireless ATM network 101. Such a network may be formed, for example, by people around a meeting table, with communicating devices (1–5) for exchanging documents or notes. As each person enters the meeting, or as each person activates his or her communicating device, the network expands to include the new communications station; the network may also contract, as people leave the meeting or sign off the network. The network is termed adhoc, because the formation and structure of the network is not fixed.

To initially form the network, one of the stations must perform the function of a centralized controller. That is, for example, the first station to be turned on will act as a centralized controller, and will transmit a beaconing signal. This beaconing signal would be part of a network protocol wherein, in response to a beacon, stations wishing to enter the network would respond in accordance with the aforementioned protocol. Conventionally, the portion of the protocol which addresses how the devices operate within the medium of the network is termed the Medium Access Control (MAC) level protocol. The adhoc centralized controller, utilizing the network MAC protocol, would then manage any subsequent transmission requests from each of the stations which it has admitted to the network. The management of transmission requests is accomplished by, for example, allocating specific time slots for each of the requesting transmitters. In accordance with ATM standards, a Quality of Service (QoS) parameter is associated with the admission of a station into the network. The centralized controller is responsible for determining the QoS level which can be allocated to each station, and then allocating the time slots for transmission in accordance with this QoS. That is, for example, the centralized controller may grant a minimum bandwidth allocation QoS to a station; thereafter, on demand, the centralized controller must allocate a sufficient time slot to that station to satisfy the granted bandwidth allocation QoS.

Although the centralized controller manages all the traffic flow in the network, it does not necessarily carry all the traffic flow. For efficiency, each station may transmit directly to any other station in the network. The MAC protocol will contain the necessary structure for effecting this station to station communication. For example, each message from each station may contain the address(es) of the intended recipient(s). Alternatively, the allocation messages from the centralized controller could also contain the intended recipients for each of the allocated transmission slots, thereby allowing the wireless stations to enter a standby state between transmissions or receptions, thereby saving power.

Figure 2A:
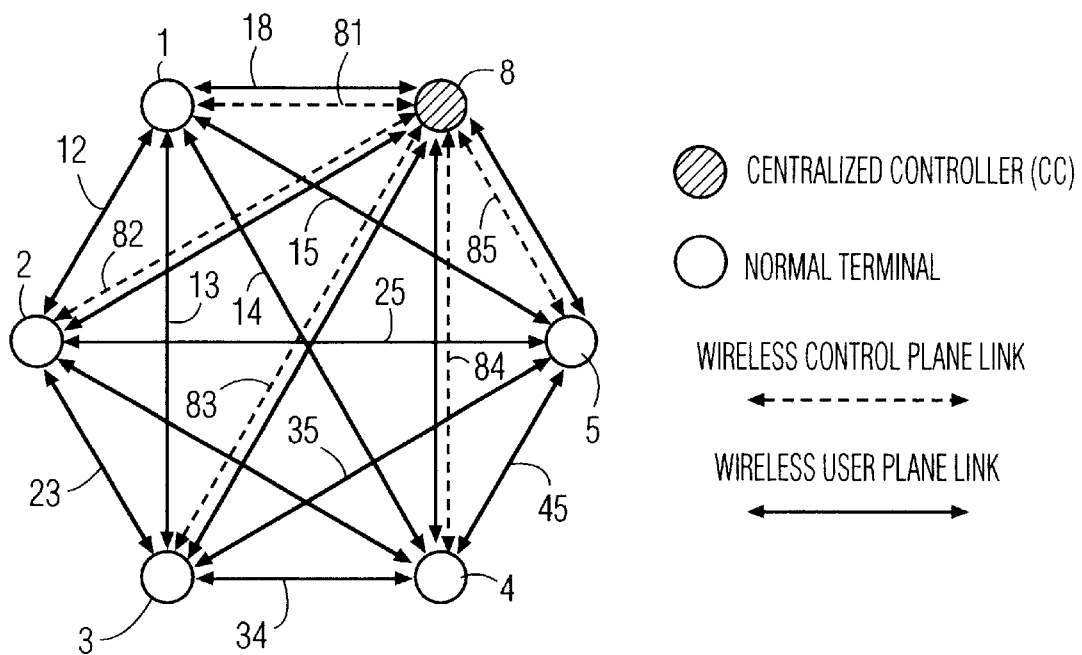
FIGS. 2a and 2b show, the Control and User Plane Link Constellations of a wireless network.

Communications within the network thus comprise controller-to-station Control communications, and station-to-station, or User communications. FIG. 2a shows the communications within a network having a centralized controller 8 and wireless terminals 1, 2, 3, etc. that operate in accordance with the present invention on the Control and User communications planes. As can be seen, for effective control, the centralized controller 8 must be able to communicate with each of the wireless terminals 1, 2, 3, etc., along the control links 81, 82, 83, etc. Each of the wireless terminals 1, 2, 3, etc. must be able to communicate with each other terminal along user links 12, 13, 23, etc. to transmit messages to each other. If a user link is inoperative, due to interference or the attenuation of the signal due to distance, messages cannot be passed between the affected stations. If a control link is inoperative, however, the centralized controller will not be able to receive a request for transmission allocation from the affected station, or the affected station will not receive notification of the allocation. Thus, the communications links in the Control plane must be reliable, because without the control link, a station is, effectively, cut off from communication with every other station, even those with which a reliable user link exists.

Figure 2B:
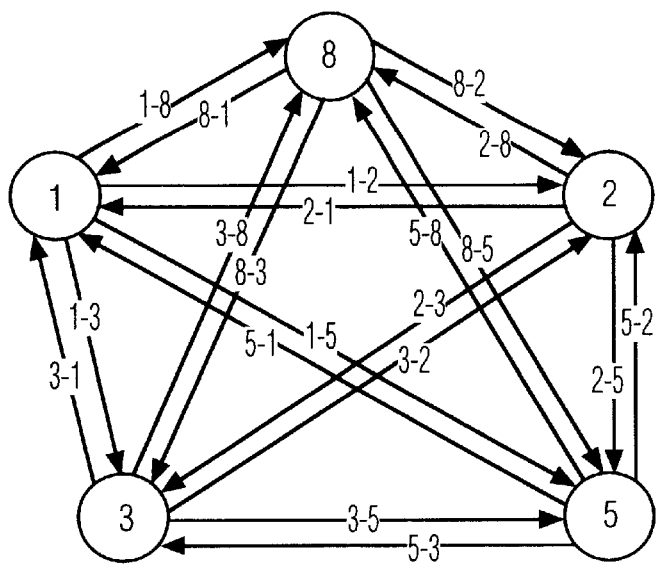

In accordance with this invention, the quality of each communication link is continually assessed. In a wireless network, the transmissions are broadcast, and are receivable by any station within some viable range of the transmitter. Thus, whenever any station is transmitting, every other station on the network can assess the quality of reception of that transmission, even if the message is not intended to be received by each of these stations. If a receiving station knows, via the MAC protocol, which station is transmitting during each allocated time slot, the receiving station can monitor the network during each time slot, and associate a received signal quality to the transmitting station allocated to that slot. Thus, for example, station 1 of FIG. 2 can monitor the network during the time period allocated to station 2a, and assess the quality of link 12. Similarly, station 2 can monitor the network during the time period allocated to station 1, and also assess the quality of link 12. Each link, being bidirectional, will have two quality factors associated with it; in each case the quality factor is the quality of the signal as received. FIG. 2b shows each path of the link independently, wherein path 1-2 is the path from station 1 to station 2, and path 2-1 is the path from station 2 to station 1. The quality of path 1-2 is the quality of the signal transmitted by station 1, as received by station 2; and the quality of path 2-1 is the quality of the signal transmitted by station 2, as received by station 1.

Typically, the same means of communication are utilized in both the control and user planes of communication, and therefore the quality assessment can be made in either plane, and will be applicable in either plane. That is, station 2 can assess the quality of path 1-2 by monitoring the user, station-to-station, communications of station 1; or, it can assess the quality of path 1-2 by monitoring the control, station-to-controller communications of station 1. If alternative means are utilized for control and user communications, quality assessments for each of these types of communication can also be maintained.

The quality assessment by each station can be made by a number of techniques well known to those skilled in the art. As the signal is received, the SNR (Signal to Noise Ratio) can be measured and used as the quality assessment. Alternatively, the strength of each received signal can be measured in a relative manner, for example by the magnitude of the feedback signal in an AGC (Automatic Gain Control) circuit, and the quality assessment could be an ordering of each transmitting station by the magnitude of this signal.

In digital systems, other quality means are also available. A common quality measure for digital systems is an estimate of the likelihood of an erroneous bit value being received, a bit error. Most communications protocols include an error detection means, and, the detection of an error can be used for an assessment of a bit error rate associated with the path. In the simplest protocols, parity bits are employed to verify the integrity of each data byte. A receiver can perform a bit error quality assessment by counting the number of bytes with improper parity. A weak path would have a high proportion of improper parity bytes, whereas a strong path would exhibit a low proportion of improper parity bytes. In other protocols, error correction bytes are appended to the data messages. A count of the number of times the correction bytes are employed to self-correct the data message may also be utilized as a quality assessment measure.

Note that the aforementioned quality assessments are independent of the data content of the signals being transmitted by the transmitting station, and therefore each station can monitor the quality without the need to decode, per se, each of the transmissions. This allows for a quality assessment with minimal overhead, and also allows for security means, such as the encryption of the data contents, to be employed without impacting the feasibility of this quality assessment. Note also that the quality assessment is performed by monitoring the routine transmissions of the stations; that is, a separate test messaging procedure is not required. This requires, however, that the station routinely transmit, for the quality assessment to occur. If a station has no traffic to send for an extended period, the protocol can be enhanced to include a prompt by the central controller for the station to transmit a dummy, or test, message.

Depending on the network environment, the quality assessment can occur regularly, or on demand. If it is known that the network is relatively stable, the quality assessment may be made only upon the entry or removal of a station from the network. If the network is dynamic, for example, comprising mobile wireless terminal, such that the characteristics of each path may change often, quality assessments may be made continuously, with each transmission. Also dependent upon the dynamic nature of the network, alternative means can be employed to process a number of quality assessments for each path. For example, a running average may be maintained and updated with each transmission assessment, or, the latest assessment may replace any prior assessment. In a very low error rate and stable environment, a cumulative measure may be utilized, such as the sum of parity errors received over the previous N transmissions.

Figure 3:
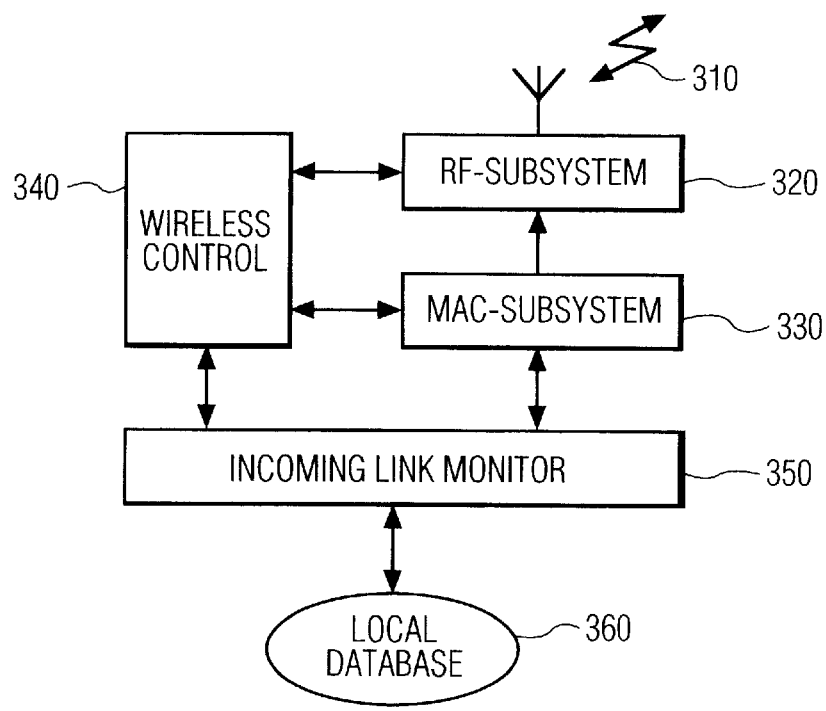
FIG. 3 shows a block diagram for a Link Monitor of a wireless terminal.

The quality assessment process is shown in FIG. 3 as a partial block diagram of a receiving station. As shown, the receiving station receives an RF signal 310 into an RF-Subsystem 320. A Medium Access Control (MAC) Subsystem 330 operates in conjunction with a Wireless Control block 340 to direct selected portions of the received signal to the Link Monitor 350. The MAC Subsystem 330 and Wireless Control block 340 determine which transmitter is transmitting the signal being received, as discussed above, and the Link Monitor 350 performs the SNR measurements or bit error measurements discussed above. The results of the assessment, and the corresponding transmitting station identifier, are stored in a local data base 360 within each receiving station.

Each station will maintain, in its local data base 360, a quality assessment for each path to each other station. For example, station 1 will maintain the quality assessments for paths 2-1, 3-1, 4-1, etc. Station 3 will maintain the quality assessments for paths 1-3, 2-3, 4-3, etc.

Figure 4:
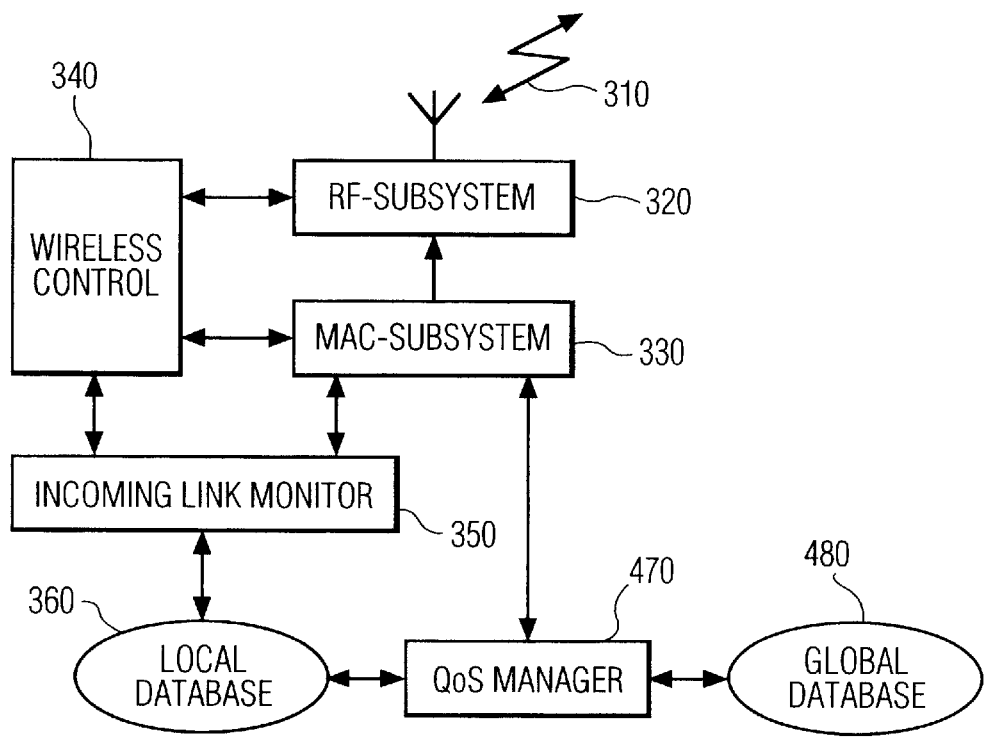
FIG. 4 shows a block diagram for a Link Monitor of a centralized controller.

The block diagram of a central controller is shown in FIG. 4. The centralized controller will periodically poll the stations within the network for the quality assessments. As shown in FIG. 4, because the centralized controller is typically also an operational wireless terminal, the centralized controller contains elements similar to those of FIG. 3. The centralized controller, as a wireless station, maintains a local data base 360, as discussed above. The centralized controller also contains a QoS Manager 470, which performs the time allocation process for controlling the MAC subsystem 330. The QoS Manager 470, via the MAC protocol, polls the stations for their quality assessments. Upon receipt of these assessments, via the RFS-Subsystem 320, the Wireless Control block 340, and the MAC subsystem 330, the QoS Manager 470 stores the quality factors from each station, and from its own local database 360, into a Global Database 480. Thus, the Global Database will contain a quality assessment for each path within the network. From this assessment, the centralized controller QoS Manager 470 can assess how well its transmissions are being received by each of the other stations. More significantly, it can assess whether any station is being received by each of the other stations with a higher quality measure.

Commensurate with this invention, any number of techniques may be employed to evaluate the network quality assessment measurements to select a preferred station to be utilized as centralized controller. FIG. 5 shows the organization of the quality measurements as a matrix. The rows of the matrix are the transmitting station identifiers, and the columns of the matrix are the receiving station identifiers. The entry at each cell of the matrix is the reported quality assessment, ranging from 0 for low quality, to 100 for high quality. To demonstrate the dynamic nature of the network, transmitters 4 and 7 are shown having a quality of 0 for each receiver, indicating that transmitters 4 and 7 are no longer actively transmitting in the network. Alternatively, the entries for these stations could contain the last reported values concerning these stations.

Assuming that, consistent with FIG. 2, station 8 is the centralized controller, it can be determined that station 2 would be a preferable station to perform the functions of a centralized controller. In all instances, transmissions from station 2 are received at each other station with a higher quality measure than transmissions from station 8. That is, the entry at row 2, column 1, hereinafter referred to as cell 2-1, representing the quality of transmission from station 2 to station 1, is 82. The entry at cell 8-1 (row 8, column 1), representing the quality of transmission from station 8 to station 1, is 78. Therefore transmission from station 2 are received at station 1 with higher quality than transmissions from station 8. From the perspective of station 1, station 2 is preferred to station 8. Similarly, the entries at cells 2-3, 2-5, and 2-6 are higher, respectively, than those at 8-3, 8-5, and 8-6. Thus, stations 3, 5, and 6 would each prefer station 2 to station 8.

In conventional optimization terminology, station 2 is said to dominate station 8, with respect to receptions at each of the other stations. If station 2 has the capability of providing central controller services, the network can be reconfigured to replace station 8 with station 2 as the central controller. This reconfiguration can be accomplished by having station the station 8 QoS Manager send a message to the station 2 QoS Manager, instructing it to assume the role of central controller. Accompanying this message would be any information required by station 2 to perform the tasks of the central controller for the existing network, including such items as the current network configuration, the assigned QoS to each station, etc. Thereafter station 2 would respond to requests for services from the other stations and respond accordingly.

Other techniques or algorithms can be used to select a preferrable central controller. For example, the station having the highest minimum value may be selected as the preferred centralized controller. Although station 2 dominates station 8, station 5 may be selected as the preferred centralized controller because its minimum received quality is 67, at cell 5-3. That is, even though its signal is not received as strongly at station 1 than that of either stations 2 or 8, having a quality of 71 at 5-1, compared to qualities of 82 and 78 at 2-1 and 8-1 respectively, the reception of signals from station 5 is at least 67 for all stations, whereas station 2 has a quality measure of 48 at receive station 6 (cell 2-6), and station 8 has a quality measure of 42 at station 3 (cell 8-3).

An alternative selection technique can be to choose the station having the greatest average received quality, or the greatest mean squared received value, or other characteristic statistic value. Additionally, a combination of these techniques can be employed. For example, a specified minimum value can be required, and from among those stations having each of their quality measures greater than the specified minimum, the station having the highest average quality measure can be selected. In addition to considering the quality of a station's transmissions to each of the other stations, the station's reception quality from each of the other stations can be considered. For example, the station having the highest minimum entries in its corresponding rows and column in the matrix may be selected as the preferred station. Or, the station which has at least a specified minimum quality of reception from other stations and has the highest average quality of reception of its transmissions to the other stations may be the preferred centralized controller. These and other selection and optimization techniques are well known to one skilled in the art, and are within the scope and spirit of this invention.

Additionally, the selection of a new centralized controller can be made to be dependent upon the quality assessment of the existing centralized controller. That is, for example, a new centralized controller may not be selected unless and until the existing centralized controller falls below some specified quality criteria. In this way, the overhead required to transfer control to another station can be avoided until it becomes important for the integrity of the network.

A further use of the quality assessment in accordance with this invention is to select alternative relay retransmission paths. If a path has a poor quality, efficiency will be lost as transmissions across this path may often require repetition until they are received accurately. Most protocols include some form of ACK/NAK (Acknowledged/Not-Acknowledged) signaling. When an intended receiver does not respond with an Acknowledge signal, directly or via the centralized controller, the transmitter must resend the transmitted message. Efficiency may be improved by noting which paths require repeated transmissions, and replace the affected paths with alternative, relay paths, wherein messages are transmitted to one station, for relay to another station. Such a relay will require two transmissions per message; the message is transmitted from the original transmitter to the relay station, and then from the relay station to the original intended receiver. If the paths to and from the relay station are reliable, a gain in efficiency can be achieved by instituting such a relay path if the original (direct) path averaged more than one repetition per message. Consider, for example, transmission path 1-3, with a quality measure of 21 shown in FIG. 5. If this path exhibits frequent repetitions of transmissions, due to the poor quality, a more reliable and efficient alternative path can be created by the QoS Manager considering the quality measures of other paths. Transmission path 1-6 shows a high quality measure (88), as does path 6-3 (91). Based on these measured quality levels, the problematic path 1-3 can be replaced by a relay path of 1-6-3; that is, transmissions from station 1 intended for station 3 will be received by station 6 and retransmitted by station 6 to station 3.

Relay paths may also be instituted based solely on the measured quality levels. That is, for example, quality levels below a specified value may be considered a priori unreliable. If a path is deemed unreliable, an alternative relay path is established. That is, for example, if a quality level of 25 is selected as a threshold value, below which a path is deemed unreliable, then path 1-3 in FIG. 5, having a quality level of 21, would be deemed unreliable, regardless of the number of retransmission experienced between paths 1 and 3. Based on this determination, alternative relay path 1-6-3 would be instituted as discussed above. Optionally, both techniques may be employed to initiate the institution of a relay path: a relay path is established if either the retransmission rate of the path is above a specified level or if the quality measure is below a specified level. Or, a set of combinations of retransmission rates and quality levels could be used to institute a relay path. For example, path 3-1 has a mediocre quality level (35) shown in FIG. 5. A rule may be established such that any path having a quality level below 40 will be replaced by a relay path upon the occurance of the first request for retransmission. Thereby, if no retransmissions are required on path 3-1, despite its somewhat low quality level, it would not be replaced by an alternative relay path. Conversely a rule may be established whereby any path having a quality level above 60 will not have an alternative relay path established until five retransmission requests are experienced on that path within a given time period; in this way, intermittent interferences will not necessarily trigger the establishment of a relay path to replace a path with a somewhat good quality measure. These and other techniques for determining when to initiate a relay path based upon quality measures will be evident to one skilled in the art and are within the object and scope of this invention.

The foregoing merely illustrates the principles of the invention. It will thus be appreciated that those skilled in the art will be able to devise various arrangements which, although not explicitly described or shown herein, embody the principles of the invention and are thus within its spirit and scope.

We claim:

1. A wireless communications system comprising a plurality of wireless communication stations associated with a network,
   one of said wireless stations being designated as a central station,
   each of said wireless stations comprising a transmitter and a receiver,
   said network comprising a transmit-receive path between each transmitter of each of said wireless stations and each receiver of each of said other wireless stations,
   each of said transmitters comprising a means for transmitting a message for reception by one or more of the receivers of the other wireless stations,
   each of said receivers comprising:
      a means for receiving a received message, said received message being a transmitted message from one of said transmitters,
      a means for identifying an identity of the transmitter of the received message,
      a means for measuring the quality of the received message, and
      a means for determining a quality factor associated with the transmitter in dependence upon the measured quality of the received message; and,
   said central station comprising:
      a means for obtaining the quality factor from at least one other wireless station, and
      a means for determining a quality measure associated with the transmit-receive paths in dependence upon said quality factors.

2. A wireless communications system as claimed in claim 1, wherein
   said means for measuring the quality of the received message comprises means for measuring a Signal-to-Noise Ratio (SNR) of a signal associated with said received message.

3. A wireless communications system as claimed in claim 1, wherein
   said means for measuring the quality of the received message comprises means for measuring a bit error rate associated with said received message.

4. A wireless communications system as claimed in claim 1, wherein the central station further comprises:
a means for determining one of said wireless stations for designation as an alternative central station in dependence upon said quality measures wherein each of said wireless stations is designatable as an alternate central station in dependence upon said quality measures.

5. A wireless communications system as claimed in claim 1, wherein the central station further comprises:
a means for assessing said quality measures, and
a means for determining a relay transmission path for one of said transmit-receive paths in dependence upon said assessment of the quality measures wherein the relay transmission path relays a message from a first one of said plurality of wireless stations to a second one of said plurality of wireless stations via a third one of said plurality of wireless stations.

6. A wireless communication device for communicating in a network comprising a plurality of wireless communication stations, wherein each of said wireless communication stations comprise a means for transmitting messages intended to be received at one or more of the other wireless communication stations,
said wireless communication device comprising:
a means for receiving a message transmitted from the wireless communication stations,
a means for identifying an identity of the wireless communication stations which transmitted the message,
a means for measuring the quality of the message, and
a means for determining a quality factor associated with each wireless communication station in dependence upon the measured quality of one or more of said received messages; and
a means for communicating said quality factors to a wireless central station.

7. A wireless communication device as claimed in claim 6, wherein
said means for measuring the quality of the message comprises means for measuring a Signal-to-Noise Ratio (SNR) of a signal associated with said message.

8. A wireless communication device as claimed in claim 6, wherein
said means for measuring the quality of the message comprises means for measuring a bit error rate associated with said message.

9. A wireless communications device as claimed in claim 6, wherein the communications device also comprises:
a means for obtaining the quality factor associated with one or more wireless communication stations from each of the other wireless communications stations, and
a means for determining a quality measure associated with the network in dependence upon said obtained quality factors.

10. A wireless communications device as claimed in claim 9, wherein the wireless communications device also comprises:
a means for determining one of said wireless stations for designation as an alternative central station in dependence upon said quality measure wherein each of said wireless stations is designatable as an alternate central station in dependence upon said quality measures.

11. A wireless communications device as claimed in claim 9, wherein the wireless communications device also comprises:
a means for determining a relay transmission path for one of said transmit-receive paths in dependence upon said quality measure wherein the relay transmission path relays a message from a first one of said plurality of wireless stations to a second one of said plurality of wireless stations via a third one of said plurality of wireless stations.

12. A method for assessing the quality of a communications network, said network comprising communication stations comprising means of transmitting and receiving messages, wherein said method comprises the steps of:
transmitting a message from a transmitting communication station,
receiving the message at a plurality of receiving communication stations,
and, at each receiving communication station,
identifying the transmitting communication station,
measuring the quality of the received message, and
determining a quality factor associated with the transmitting communication station in dependence upon the measured quality of the received message; and,
after repeating the above steps for other transmitting communication stations,
having each communication station communicate the quality factors associated with each of said transmitting communication stations to a central station,
said central station thereby assessing the quality of the communication network in dependence upon said quality factors.

13. A method as claimed in claim 12, wherein
said step of measuring the quality of the received message comprises a step of measuring a Signal-to-Noise Ratio (SNR) of a signal associated with said received message.

14. A method as claimed in claim 12, wherein
said step of measuring the quality of the received message comprises a step of measuring a bit error rate associated with said received message.

15. A method for determining a preferred central controller for a communications network, said communications network comprising communication stations and communication paths between each of said communication stations, one of said communication stations being a current central controller, wherein said method comprises the steps of:
transmitting a message from a transmitting communication station,
receiving the message at a plurality of receiving communication stations,
and, at each receiving communication station,
identifying the transmitting communication station,
measuring the quality of the received message, and
determining a quality factor associated with the transmitting communication station in dependence upon the measured quality of the received message; and,
after repeating the above steps for other transmitting communication stations,
having each communication station communicate the quality factors associated with each of said transmitting communication stations to the current central controller,
said current central controller thereafter:
assessing the quality of the communication paths in dependence upon said quality factors, and,
determining the preferred central controller in dependence upon the assessed quality of the communication paths.

16. A method as claimed in claim 15, wherein
said step of measuring the quality of the received message comprises a step of measuring a Signal-to-Noise Ratio (SNR) of a signal associated with said received message.

17. A method as claimed in claim 15, wherein
said step of measuring the quality of the received message comprises a step of measuring a bit error rate associated with said received message.

18. A method for determining a relay path for a communication path within a communications network, said communications network comprising communication stations and communication paths between each of said communication stations, one of said communication stations being a current central controller, wherein said method comprises the steps of:
transmitting a message from a transmitting communication station,
receiving the message at a plurality of receiving communication stations,
and, at each receiving communication station,
identifying the transmitting communication station,
measuring the quality of the received message, and
determining a quality factor associated with the transmitting communication station in dependence upon the measured quality of the received message; and,
after repeating the above steps for other transmitting communication stations,
having each communication station communicate the quality factors associated with each of said transmitting communication stations to the current central controller,
said current central controller thereafter:
assessing the quality of the communication paths in dependence upon said quality factors, and,
determining the relay path in dependence upon the assessed quality of the communication paths.

19. A method as claimed in claim 18, wherein
said step of measuring the quality of the received message comprises a step of measuring a Signal-to-Noise Ratio (SNR) of a signal associated with said received message.

20. A method as claimed in claim 18, wherein
said step of measuring the quality of the received message comprises a step of measuring a bit error rate associated with said received message.

21. A communication device for communicating in a network comprising a plurality of communication stations, wherein each of said communication stations comprise a means for transmitting messages intended to be received at one or more of the other communication stations,
said communication device comprising:
a means for receiving a message transmitted from the communication stations,
a means for identifying an identity of the communication stations which transmitted the message,
a means for measuring the quality of the message, and
a means for determining a quality factor associated with each communication station in dependence upon the measured quality of one or more of said received messages;
a means for communicating said quality factors to a central station;
a means for obtaining the quality factor associated with one or more communication stations from each of the other communications stations;
a means for determining a quality measure associated with the network in dependence upon said obtained quality factors; and
a means for determining one of said stations for designation as an alternative central station in dependence upon said quality measure.

22. A communication device for communicating in a network comprising a plurality of communication stations, wherein each of said communication stations comprise a means for transmitting messages intended to be received at one or more of the other communication stations,
said communication device comprising:
a means for receiving a message transmitted from the communication stations,
a means for identifying an identity of the communication stations which transmitted the message,
a means for measuring the quality of the message, and
a means for determining a quality factor associated with each communication station in dependence upon the measured quality of one or more of said received messages;
a means for communicating said quality factors to a central station;
a means for obtaining the quality factor associated with one or more communication stations from each of the other communications stations;
a means for determining a quality measure associated with the network in dependence upon said obtained quality factors; and
a means for determining an alternative relay transmission path for one or more of said transmit-receive paths in dependence upon said quality measure.

23. A communication system comprising:
a plurality of devices, each of said plurality of devices comprising:
a transmitter for transmitting a message; and
a receiver for receiving messages from each other of said devices and from said received messages, to determine corresponding quality factors of said received messages, wherein each of said plurality of devices is selectable as a central station in dependence upon said quality factors, wherein said devices identify an identity of the devices that transmitted each of said messages, store the device identities along with the corresponding quality factors, and transmit said stored device identities and corresponding quality factors to said selected central station.

24. The communication system of claim 23, wherein said selected central station receives said stored device identities and corresponding quality factors from each of said plurality of devices and selects an alternate central station in dependence upon said received stored device identities and corresponding quality factors.

25. The communication system of claim 23, wherein said system selects relay transmission paths between said devices in dependence upon said quality factors.

26. A wireless communication for communication within a wireless communication system containing a plurality of other wireless communication devices, said wireless device comprising:
a transmitter for transmitting a message; and
a receiver for receiving messages from said other wireless devices and from said received messages, determining corresponding quality factors of said received messages, and wherein said wireless device is selectable as an alternate central station in dependence upon said quality factors, wherein said wireless device identifies the wireless devices that transmitted each of said messages, stores the wireless device identities along with the corresponding quality factors, and transmits said stored device identities and corresponding quality factors to a selected central station.

27. The wireless device of claim 26, wherein said wireless device receives said device identities and corresponding quality factors from other wireless devices and selects an alternate central station from said other wireless devices in dependence upon said received stored device identities and corresponding quality factors if said wireless device is said selected central station.

28. A wireless communication device for communication within a wireless communication system containing a plurality of other wireless communication devices, said wireless device comprising:

a transmitter for transmitting a message; and a receiver for receiving messages from said other wireless devices and from said received messages, determining corresponding quality factors of said received messages, and wherein said wireless device is selectable as an alternate central station in dependence upon said quality factors, wherein said wireless device selects relay transmission paths between each wireless device of said communication system in dependence upon said quality factors if said wireless device is said selected central station wherein the relay transmission path relays a message from a first one of said plurality of wireless stations to a second one of said plurality of wireless stations via a third one of said plurality of wireless stations.

* * * * *